(12) United States Patent
Lawson et al.

(10) Patent No.: US 12,294,674 B2
(45) Date of Patent: *May 6, 2025

(54) SYSTEM AND METHOD FOR DETERMINING AND COMMUNICATING PRESENCE INFORMATION

(71) Applicant: Twilio Inc., San Francisco, CA (US)

(72) Inventors: Jeff Lawson, San Francisco, CA (US); Evan Cooke, San Francisco, CA (US); Robert J. Simutis, San Francisco, CA (US); Patrick Malatack, San Francisco, CA (US); Kyle Conroy, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,380

(22) Filed: Apr. 10, 2024

(65) Prior Publication Data

US 2024/0259493 A1 Aug. 1, 2024

Related U.S. Application Data

(63) Continuation of application No. 17/950,420, filed on Sep. 22, 2022, now Pat. No. 11,997,231, which is a
(Continued)

(51) Int. Cl.
*H04M 3/42* (2006.01)
*H04L 9/40* (2022.01)
(Continued)

(52) U.S. Cl.
CPC ...... *H04M 3/42374* (2013.01); *H04L 51/043* (2013.01); *H04L 63/10* (2013.01);
(Continued)

(58) Field of Classification Search
CPC .. H04M 3/42374; H04L 51/043; H04L 63/10; H04L 67/025; H04L 67/54; H04W 4/16
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

Abu-Lebdeh M., et al., "A 3GPP 4G Evolved Packet Core-Based System Architecture for QoS-Enabled Mobile Video Surveillance Applications," Third International Conference on the Network of the Future (NOF), Nov. 21-23, 2012, pp. 1-6.
(Continued)

*Primary Examiner* — Joseph E Dean, Jr.
(74) *Attorney, Agent, or Firm* — Lowenstein Sandler LLP

(57) ABSTRACT

A system and method for communicating presence information that can include at a first server of a communication platform, receiving an authorization token of a first client application; verifying at least one permission associated with the authorization token; registering a presence status of the first client application upon verifying the at least one permission of the authorization token; at a second server of the communication platform, accepting an incoming communication request; retrieving communication instructions according to the incoming communication request; identifying an instruction to communicate with a communication destination of the first client application; accessing the presence status resource of the first client application; estab-
(Continued)

lishing communication with the first client application according to the accessed presence status resource.

18 Claims, 12 Drawing Sheets

Related U.S. Application Data continuation of application No. 17/070,584, filed on Oct. 14, 2020, now Pat. No. 11,489,961, which is a continuation of application No. 16/845,079, filed on Apr. 10, 2020, now Pat. No. 10,841,421, which is a continuation of application No. 16/245,779, filed on Jan. 11, 2019, now Pat. No. 10,686,936, which is a continuation of application No. 15/911,902, filed on Mar. 5, 2018, now Pat. No. 10,212,275, which is a continuation of application No. 15/337,087, filed on Oct. 28, 2016, now Pat. No. 9,942,394, which is a continuation of application No. 14/946,669, filed on Nov. 19, 2015, now Pat. No. 9,641,677, which is a continuation of application No. 13/624,750, filed on Sep. 21, 2012, now Pat. No. 10,182,147.

(60) Provisional application No. 61/537,223, filed on Sep. 21, 2011, provisional application No. 61/537,217, filed on Sep. 21, 2011.

(51) Int. Cl.
*H04L 51/043* (2022.01)
*H04L 67/025* (2022.01)
*H04L 67/54* (2022.01)
*H04W 4/16* (2009.01)

(52) U.S. Cl.
CPC ............ *H04L 67/025* (2013.01); *H04L 67/54* (2022.05); *H04W 4/16* (2013.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Ström et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |

(56) References Cited

U.S. PATENT DOCUMENTS

| | | |
|---|---|---|
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Räsänen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,298 B2 | 3/2010 | Day et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Söderström et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,917 B2 | 3/2012 | Helbling et al. |
| 8,139,730 B2 | 3/2012 | Da Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B2 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |

(56) References Cited

U.S. PATENT DOCUMENTS

| | | |
|---|---|---|
| 8,695,077 B1 | 4/2014 | Gerhard et al. |
| 8,713,693 B2 | 4/2014 | Shanabrook et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,137,127 B2 | 9/2015 | Nowack et al. |
| 9,141,682 B1 | 9/2015 | Adoc, Jr. et al. |
| 9,177,007 B2 | 11/2015 | Winters et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,460,169 B2 | 10/2016 | Hinton et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,641,677 B2 | 5/2017 | Lawson et al. |
| 9,942,394 B2 | 4/2018 | Lawson et al. |
| 10,182,147 B2 | 1/2019 | Lawson et al. |
| 10,212,275 B2 | 2/2019 | Lawson et al. |
| 10,686,936 B2 | 6/2020 | Lawson et al. |
| 10,841,421 B2 | 11/2020 | Lawson et al. |
| 11,489,961 B2 * | 11/2022 | Lawson ................ H04L 67/54 |
| 11,997,231 B2 * | 5/2024 | Lawson ................ H04L 51/043 |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 * | 11/2004 | Andrews ............ H04L 65/1069 379/265.03 |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0210113 A1 | 9/2005 | Kasuga et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0104306 A1 | 5/2006 | Adamczyk et al. |

(56) References Cited

U.S. PATENT DOCUMENTS

| | | |
|---|---|---|
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0239234 A1 | 10/2006 | Rao et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert, Jr. |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0114776 A1 | 5/2008 | Sun et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern, I et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |

(56) References Cited

U.S. PATENT DOCUMENTS

| | | |
|---|---|---|
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312839 A1 | 12/2010 | Zhang |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0250895 A1 | 10/2011 | Wohlert et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran |
| 2012/0114112 A1 | 5/2012 | Rauschenberger et al. |
| 2012/0149404 A1 | 6/2012 | Beattie, Jr. et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |

(56) References Cited

U.S. PATENT DOCUMENTS

| | | |
|---|---|---|
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | H10294788 A | 11/1998 |
| JP | 2004166000 A | 6/2004 |
| JP | 2004220118 A | 8/2004 |
| JP | 2006319914 A | 11/2006 |
| WO | 9732448 A1 | 9/1997 |
| WO | 02087804 A1 | 11/2002 |
| WO | 2006037492 A1 | 4/2006 |
| WO | 2009018489 A2 | 2/2009 |
| WO | 2009124223 A1 | 10/2009 |
| WO | 2010037064 A1 | 4/2010 |
| WO | 2010040010 A1 | 4/2010 |
| WO | 2010101935 A1 | 9/2010 |
| WO | 2011091085 A1 | 7/2011 |

OTHER PUBLICATIONS

Barakovic S., et al., "Survey and Challenges of QoE Management Issues in Wireless Networks," Hindawi Publishing Corporation, 2012, pp. 1-29.

Berners-Lee T., et al., "RFC 3986: Uniform Resource Identifier (URI): Generic Syntax," The Internet Society, Jan. 2005, 61 Pages, [Retrieved on Apr. 2, 2015] Retrieved from URL: https://tools.ietf.org/html/rfc3986.

Black Box Corporation: "Ethernet to Token Ring Bridge," Oct. 1999, 2 Pages, Retrieved from URL: http://blackboxcanada.com/resource/files/productdetails/17044.pdf.

Gwava Incorporated: "Archive Microsoft Office 365 Email | Retain Unified Archiving," Montreal, Canada, Jun. 24, 2015, 4 Pages, Retrieved from URL: http://www.gwava.com/Retain/Retain_for_Office_365.php.

Kim H., at al., "In-Service Feedback QoE Framework," 2010 Third International Conference on Communication Theory, Reliability and Quality of Service, 2010, pp. 135-138.

Matos R., et al., "Quality of Experience-Based Routing in Multi-Service Wireless Mesh Networks," Realizing Advanced Video Optimized Wireless Networks, IEEE, 2012, pp. 7060-7065.

Mu M., et al., "Quality Evaluation in Peer-to-Peer IPTV Services," Data Traffic and Monitoring Analysis, LNCS 7754, 2013, pp. 302-319, 18 pgs.

Realwire: "Aepona's API Monetization Platform Wins Best of 4G Awards for Mobile Cloud Enabler," 4G World 2012 Conference & Expo, Oct. 30, 2012, 4 Pages, [Accessed on Nov. 5, 2015] Retrieved from URL: https://www.realwire.com/releases/Aeponas-API-Monetization.

Subramanya S R., et al., "Digital Signatures," IEEE Potentials, Mar./Apr. 2006, pp. 5-8.

Tran H.A., et al., "User to User Adaptive Routing Based on QoE," ICNS: The Seventh International Conference on Networking and Services, 2011, pp. 170-177.

Twilio: "Twilio Cloud Communications—APIs for Voice, VoIP, and Text Messaging," Twilio Docs, 8 Pages, [Retrieved on Jun. 24, 2015] Retrieved from URL: https://www.twilio.com/docs/api/rest/call-feedback.

* cited by examiner

SYSTEM AND METHOD FOR DETERMINING AND COMMUNICATING PRESENCE INFORMATION

CROSS-REFERENCE TO RELATED APPLICATIONS

This application is a continuation of U.S. patent application Ser. No. 17/950,420 filed 22 Sep. 2022, which is a continuation of U.S. patent application Ser. No. 17/070,584 filed 14 Oct. 2020 and issued as U.S. Pat. No. 11,489,961 on 1 Nov. 2022, which is a continuation of U.S. patent application Ser. No. 16/845,079, filed 10 Apr. 2020 and issued as U.S. Pat. No. 10,841,421 on 17 Nov. 2020, which is a continuation of Ser. No. 16/245,779, filed 11 Jan. 2019 and issued as U.S. Pat. No. 10,686,936 on 16 Jun. 2020, which is a continuation of U.S. patent application Ser. No. 15/911,902, filed 5 Mar. 2018 and issued as U.S. Pat. No. 10,212,275 on 19 Feb. 2019, which is a continuation of U.S. patent application Ser. No. 15/337,087, filed 28 Oct. 2016 and issued as U.S. Pat. No. 9,942,394 on 10 Apr. 2018, which is a continuation of U.S. patent application Ser. No. 14/946,669, filed 19 Nov. 2015 and issued as U.S. Pat. No. 9,641,677 on 2 May 2017, which is a continuation of co-pending U.S. patent application Ser. No. 13/624,750, filed 21 Sep. 2012 and issued as U.S. Pat. No. 10,182,147 on 15 Jan. 2019, which claims the benefit of U.S. Provisional Application No. 61/537,223, filed 21 Sep. 2011, and U.S. Provisional Application No. 61/537,217, filed 21 Sep. 2011, all of which are incorporated in their entirety by this reference.

TECHNICAL FIELD

This invention relates generally to the telephony field, and more specifically to a new and useful system and method for determining and communicating presence information in the telephony field.

BACKGROUND

In recent years, telephony and messaging applications have spread into numerous settings including peer-to-peer computer-based telephony and messaging services. One feature of some systems relates to determining the availability or presence of a user to receive and/or engage in a communication. In order to determine and communicate this presence information, a user's terminal will repeatedly transmit his or her availability to a presence server, which then redirects that status to each and every contact of the user. Similarly, each of the user's contacts is constantly and repeatedly transmitting its presence information back to the user and each of their respective contacts. The resultant traffic of presence information grows geometrically with each additional user and contact, thereby consuming vast network and server resources while providing very little useful information at the margin. Additionally, including such functionality can require considerable engineering resources and some cases a physical presence of a server on site to support the presence functionality. Thus, there is a need in the telephony field to create a new and useful system and method for determining and communicating presence information. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Determining and Communicating Presence Information

Figure 1:
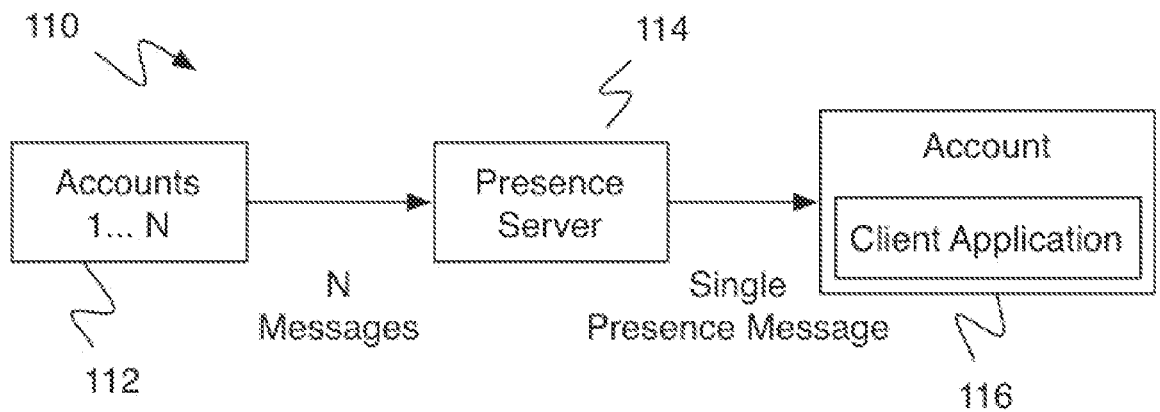
FIG. 1 a schematic block diagram of a system for determining and communicating presence information of a preferred embodiment of the present invention.
Figure 1:
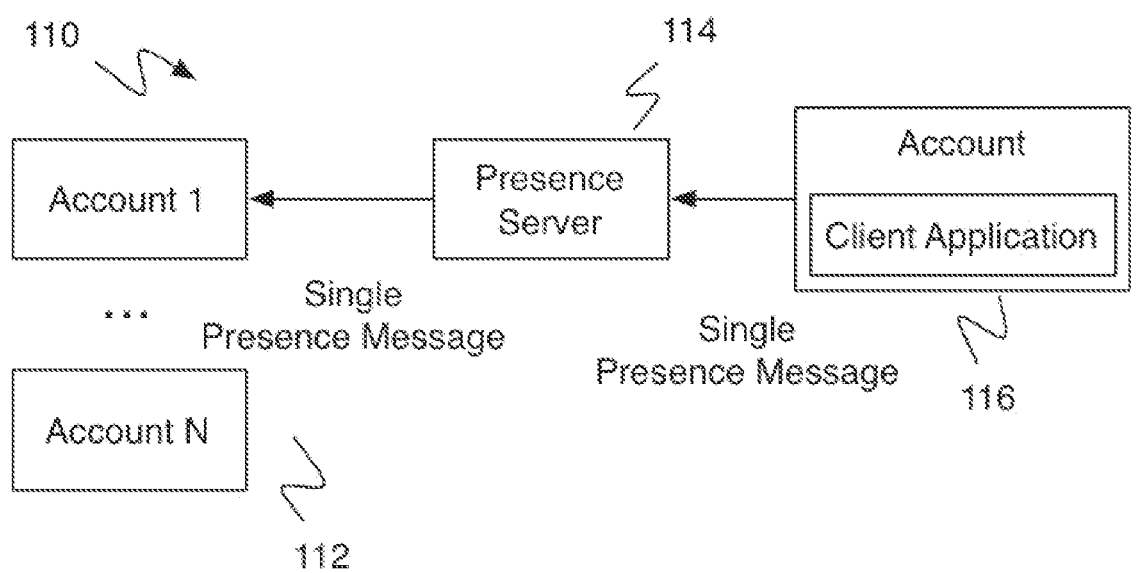

As shown in FIG. 1, a system 110 for determining and communicating presence information can function to determine and communicate the presence information in a bidirectional manner between one or more accounts 1 . . . N 112 and a client application of an account 116. Preferably, a presence server 114 can function as an intermediary between the accounts 1 . . . N 112 and the client application 116. More particularly, the presence server 114 preferably functions to receive N messages conveying the status of each of the accounts 1 . . . N 112 and convert those N messages into a single message to the client application 116, thereby substantially reducing the consumption of the presence data. Conversely, the presence server 114 preferably also functions to receive a single message from the client application 116 and convey a single message to each of the accounts 1 . . . N 112, again substantially reducing the data traffic and consumption of presence data. Preferably, the transmissions from the presence server 114 include only a single line of content for use in an API of the type described below.

Figure 2:
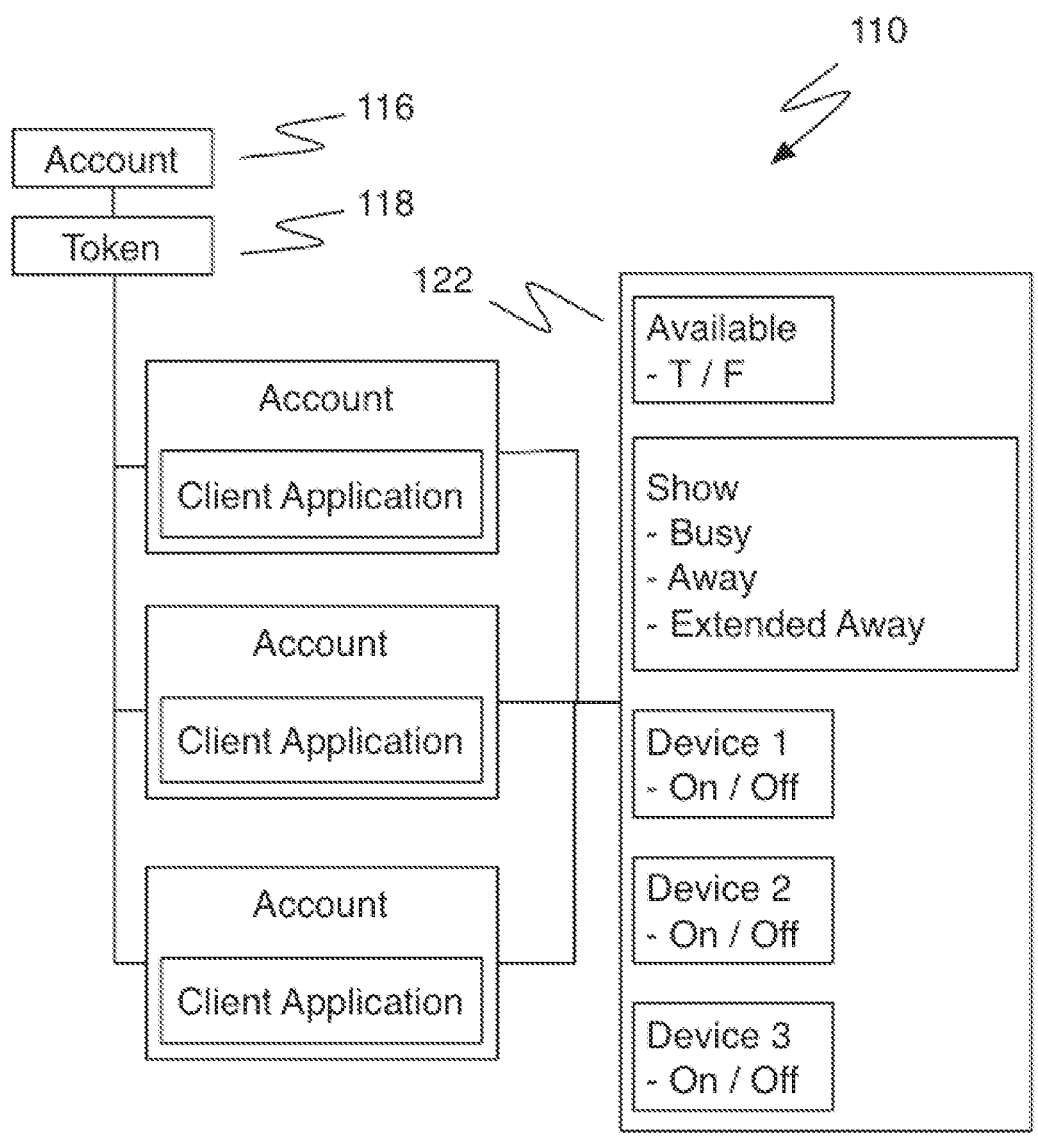
FIG. 2 is a schematic block diagram of additional aspects of the system for determining and communicating presence information of a preferred embodiment of the present invention.

In another variation of the system 110 of the preferred embodiment, the system 110 can provide for the determination and communication of presence information associated with one or more devices relating to a single account 112. An account is preferably a contact within a communication platform or system. A contact may be a name-spaced endpoint or any suitable identifier for a communication destination. As used herein, the term device can include a mobile-based telephony application, a browser-based telephony application, a PSTN telephony device (either wired or wireless), or any suitable combination thereof. As shown in FIG. 2, the account 112 can be associated with a token 118 setting forth and/or containing one or more attributes of the account 112. As an example, the token 118 can include a definition of account permissions, capabilities, authorizations, security protocols as well as presence information relating to one or more devices. Each device preferably includes a client application that runs and interfaces with the presence server to provide information of an account 112. Preferably, each of the devices can have its own presence information—that is the account might be present on his or her mobile-based application but not present at his or her browser-based telephony application. In some variations, a single device may be allowed to have two client applications running and indicate different presence information for each client application. For example, a user may have two different applications open on one device that function as communication endpoints for the account, but the user may set availability differently for each.

As shown in FIG. 2, preferably the presence data 122 can be aggregated for all devices. Alternatively, the presence data 122 can be partitioned by each client application 116 such that a account 112 can only see the presence data for those client applications 116 to which the account 112 is connectable. Preferably, the grouping and/or partitioning of the presence data by device can be established in accordance with the token 118, which as noted above can function to set the basic rules and parameters of client communication. Preferably, the presence data 122 can include one or more fields that can be populated with minimal information to convey the presence information to the account 112. As an example, the presence data 122 can include a field indicating whether an account 112 in a contact list is available and whether any one or more client applications 116 (i.e., "devices") of accounts in a contact list are accessible. Additionally, the presence data 122 can further include a field indicating the transitional status of an account that is unavailable—that is, whether the account is unavailable because he or she is busy (on another call), away from the device (down the hallway), or extended away (lunch, gone home for the day, or on vacation).

Figure 3:
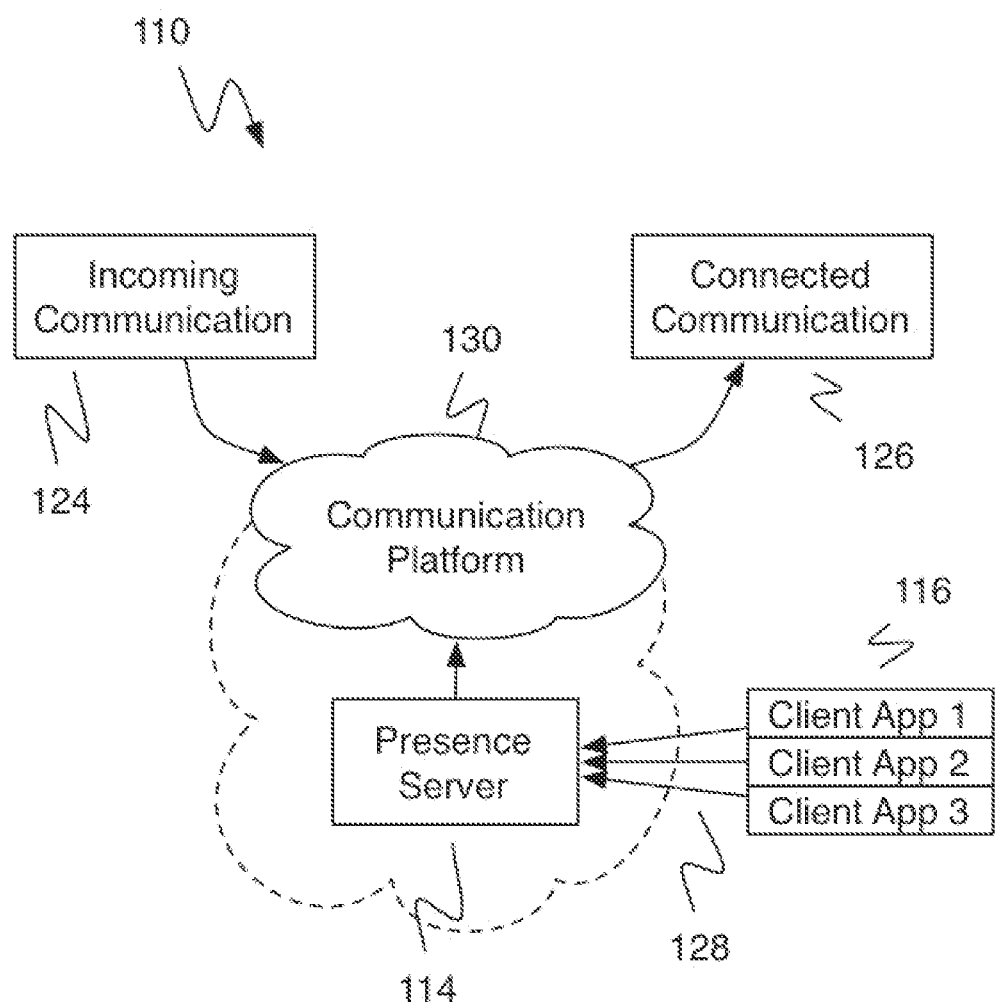
FIG. 3 is a schematic diagram of additional aspects of the system for determining and communicating presence information of the preferred embodiment of the present invention.

As shown in FIG. 3, the system 110 of the preferred embodiment can be configured in part as a communication platform cloud system 130, which can be separate from the presence server 114. Alternatively, the presence server 114 can be integrated into the cloud system 130 and/or consolidated into one or more nodes and/or functions of the cloud system 130. In one variation of the system 110 of the preferred embodiment, the presence server 114 can compose a portion of the cloud system 130, such as a cloud-based service such as that available from the assignee of the present application. Preferably, the presence server 114 and/or cloud system 130 is configured according to an Application Programming Interface (API). As used herein, the term API should be understood to mean any combination of software, firmware, and/or hardware that allows two or more software applications (i.e., machine-readable instructions) to communicate with one another. The cloud system 130 is preferably a communication platform that facilitates communication (e.g., telephony/voice sessions, video chatting, SMS messaging). An example API can be configured as a telephony platform such as one substantially similar to the one described in published U.S. Patent Application No. 2009/0252159, titled "SYSTEM AND METHOD FOR PROCESSING TELEPHONY SESSIONS", assigned to the assignee of the present application, and hereby incorporated in its entirety by this reference. The cloud service may interface with the presence server through an API. The API may be an internal presence API that is only exposed to the cloud system 130, but the presence server 114 and/or the cloud system 130 may expose an at least partial-access presence API for use by outside devices.

In another variation of the system 110 of the preferred embodiment, the presence server 114 or presence server portion of the cloud system 130 can be configured to operate in a substantially or entirely RESTful mode. Alternatively, all communications in and out of the presence server can be RESTful in nature in both directions. RESTful is understood in this document to describe a Representational State Transfer architecture as is known in the art. The RESTful HTTP requests are preferably stateless, thus each message communicated between at least the presence server 114 and the client 116 preferably contains all necessary information for the presence information relating to the client. Hardware communications elements such as routers and servers preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data can include an updated representation of the call resource, or other call state data generated as a result of call router operation, such as digits pressed on the keypad or audio recordings generated.

State information included with each request can include a unique call identifier, call status data such as whether the call is in-progress or completed, the caller ID of the caller, the phone number called, geographic data about the callers, whether a device is available for communication, and/or any suitable data. Alternatively, a varying level of a RESTful communication (statelessness) can be used, such as by using cookies, session tracking, or any suitable devices to simulate a normal website visitor model. Preferably, data sent with each request can fully enable the application server to determine the next state of the call to execute. RESTfulness preferably does not preclude using an external data source, such as a database, to lookup additional data to log call meta data, or determine application logic.

As shown in FIG. 3, the cloud system 130 can function to transition incoming communications 124 into connected communications 126 to one or more client applications 116. Preferably, each of the clients 116 can provide a presence stream 128 to the presence server 114, indicating a status of the client application 116 on one or more devices as described above. Preferably, the presence stream 128 is communicated to the cloud system 130 via a simple one line API or single API call. Alternatively, the presence server 114 can be integrated into the cloud system 130 (shown in phantom) such that the presence stream 128 can be communicated to other communications hubs in the cloud system 130 for further organization and/or transmission to contacts of the clients 116. The system 110 of the preferred embodiment preferably operates according to the single line http/API described above, and can be executed between a browser API on the client application 116 side and a cloud-based or distributed API on the cloud 130/presence server 114 side. Preferably, the systems described herein can be applied to voice communication (i.e., PSTN to browser or browser to browser voice communications) presence, although other types of communications such as video, email, SMS, MMS, IP-based messaging, proprietary messaging protocols, and the like can also be considered.

The system preferably can be configured to perform one or more of the foregoing functions in a computer-readable medium storing computer-readable instructions. The instructions are preferably executed by computer-executable components preferably integrated with the client applications 116, the cloud system 130, and/or the presence server 114. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

2. System for Communicating with a Client Application

Figure 4:
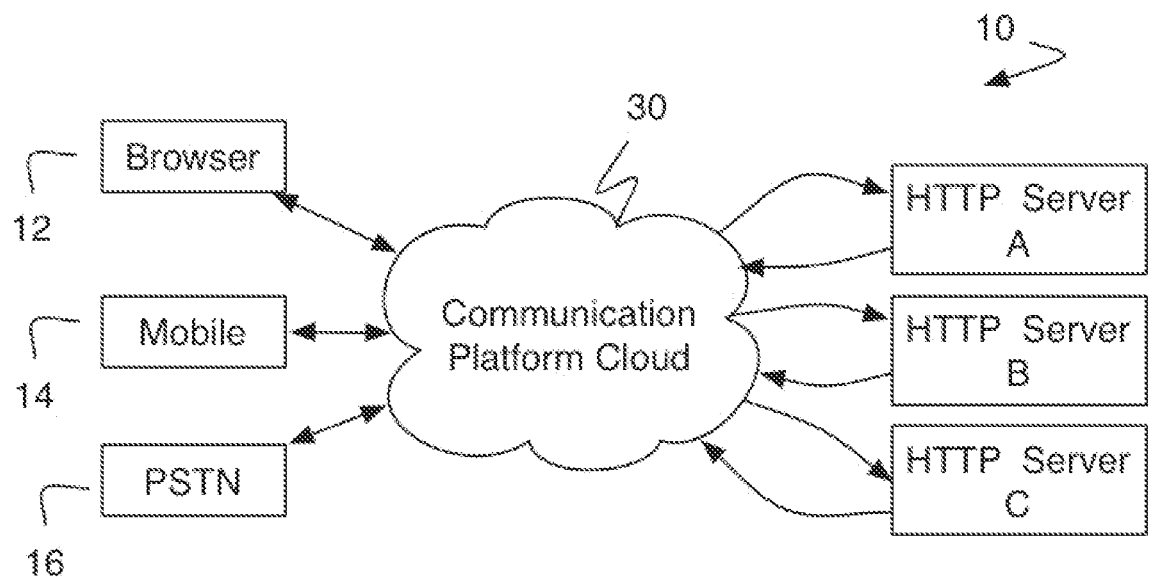
FIG. 4 a schematic block diagram of a system for connecting a call of a preferred embodiment of the present invention.

As shown in FIG. 4, a system 10 for communicating with a client application can include one or more hardware interfaces, including for example a browser 12, a mobile device 14, or a public switched telephone network (PSTN) line 16. In the system 10 of the preferred embodiment, each of the hardware interfaces 12, 14, 16 can be connected and/or interconnected with one another through a communication platform cloud-based service 30 such as that available from the assignee of the present application. Preferably, the cloud service 30 is configured according to an Application Programming Interface (API). As used herein, the term API should be understood to mean any combination of software, firmware, and/or hardware that allows two or more software applications (i.e., machine-readable instructions) to communicate with one another. An example API can be configured as a telephony platform such as one substantially similar to the one described in published U.S. Patent Application No. 2009/0252159, titled "SYSTEM AND METHOD FOR PROCESSING TELEPHONY SESSIONS", assigned to the assignee of the present application, and hereby incorporated in its entirety by this reference.

As shown in FIG. 4, the cloud system 30 functions to communicate with one or more client HTTP servers 18, 20, 22. The cloud system 30 and HTTP server 18, 20, 22 communications are preferably RESTful in nature in both directions. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. Hardware communications elements such as routers and servers preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data can include an updated representation of the call resource, or other call state data generated as a result of call router operation, such as digits pressed on the keypad or audio recordings generated.

State information included with each request can include a unique call identifier, call status data such as whether the call is in-progress or completed, the caller ID of the caller, the phone number called, geographic data about the callers, and/or any suitable data. Alternatively, a varying level of a RESTful communication (statelessness) can be used, such as by using cookies, session tracking, or any suitable devices to simulate a normal website visitor model. Preferably, data sent with each request can fully enable the application server to determine the next state of the call to execute. RESTfulness preferably does not preclude using an external data source, such as a database, to lookup additional data to log call meta data, or determine application logic.

The hardware interfaces 12, 14, 16 function to interface with the human element of the communication through voice, video, short message service (SMS), multimedia messaging service (MMS), proprietary or alternative IP messaging protocols, or other communication means and/or protocols. As an example, the browser 12 can include any web-enabled browser that is capable of receiving and/or transmitting voice signals such as through real time messaging protocol (RTMP) or other suitable TCP-type communication protocols. Alternatively, the browser 12 can include any plug-in enabled browser that is configured for session initiated protocol (SIP) communications that can be transmitted through TCP, UDP and/or other suitable protocols. Similarly, the mobile device 14 can include a SIP module or other suitable communication protocol. Preferably, each of the browser 12 and the mobile device 14 can be connected and/or connectable to the cloud service 30 through any suitable type of network, including but not limited to, wide area networks, local area networks, mobile telephony networks, or any suitable combination thereof. As an example, many current mobile devices 14, such as tablet computers, are connectable to the Internet through both WiFi and mobile telephony (GSM and CDMA) networks.

Figure 5:
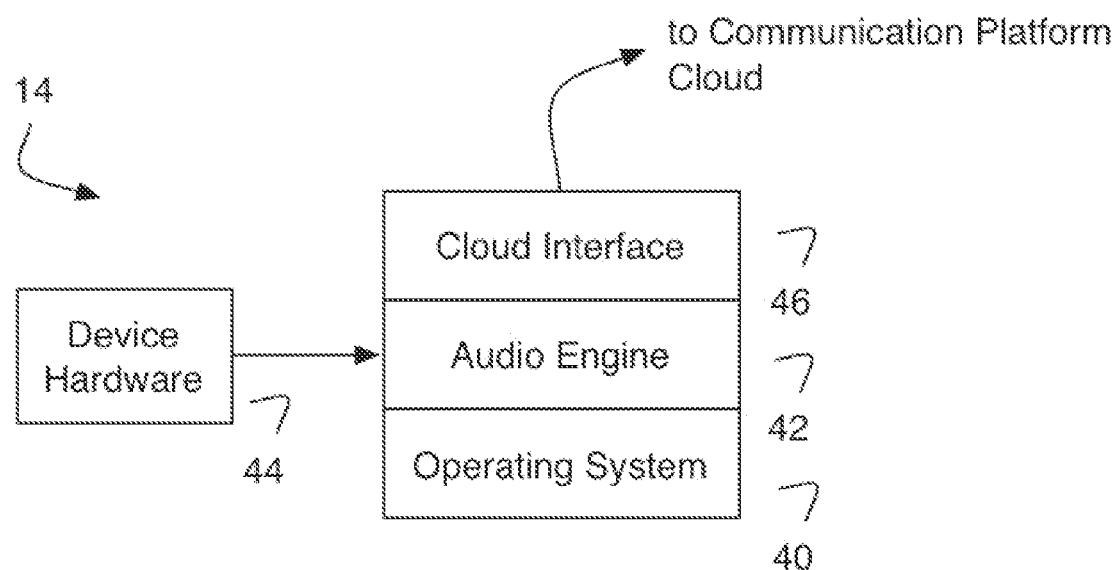
FIG. 5 is a schematic block diagram of a mobile architecture operable in the system for connecting a call of a preferred embodiment of the present invention.

The mobile device 14 of the system 10 of the preferred embodiment can include a series of modules relating to its communication function. As shown in FIG. 5, the mobile device 14 of the preferred embodiment can include an operating system module 40, an audio engine 42, and a cloud interface module 46. The operating system module 40 of the mobile device 14 of the preferred embodiment functions to control the general functionality of the mobile device 14, including but not limited to its communication capabilities. The audio engine 42 of the mobile device 14 of the preferred embodiment functions to control a majority of voice communication functions, including interfacing with any device hardware 44 such as speakers and microphones. In particular, the audio engine 42 can function to initiate and control communication sessions including voice communication sessions using Internet protocol (rather than a typical telephony communication protocol typically used in a mobile device).

The mobile device 14 of the preferred embodiment can further include a cloud interface module 46 that functions to cooperate with the audio engine 42 to communicate with the cloud service 30 and communicate with other hardware interfaces 12, 14, 16. The cloud interface module 46 can be configured within a browser function of the mobile device 14, or alternatively as a native application or set of machine executable instructions residing permanently or quasi-permanently in a memory module (not shown) of the mobile device 14. Preferably, the cloud interface module 46 can be designed according to the RESTful principles described above.

In one variation of the mobile device 14 of the preferred embodiment, the cloud interface module 46 can further include one or more security and/or resource management tools described in further detail below. Examples of security and/or resource management tools can include an authorization token, which can be defined as an electronic listing of possible privileges for its bearer. A developer or other suitable account holder preferably obtains an account token from the provider of the cloud service 30 and then signs the account token to generate an authorization token. The authorization token can be used to authorize actions when included in communication requests, client registration, client presence registration, and/or any suitable use. The cloud service or any suitable service can preferably verify the authorization token by validating the signature of the authorization token against the account key. Thus enabling possibly untrusted client applications to prove that they are authorized to perform particular actions. Example privileges conferred by a token can include, but are not limited to, a user's abilities to make and/or receive calls, an identification of the application and/or user, and one or more operational parameters that can further define a scope of functions and/or processes performable by the cloud interface module 46. In one exemplary variation, an authorization token permits a communication request to send one or more communications. In another exemplary variation, an authorization token can permit a communication request to establish a communication session that supports communications selected from audio, video, chat, and/or other suitable communication mediums. In another variation an authorization token can permit presence information to be provided to other devices or to be obtained from other devices or a contact list. In one alternative embodiment, the token can be transmittable in its entirety in the clear. In another alternative embodiment, some or all aspects of the token are encrypted during transmission and are partially or entirely unknown to the user of the mobile device 14. The cloud service 30 may be substantially agnostic relative to the contents of the token insofar as the contents of the token can be directed entirely to the HTTP server or to a authorization server indicating if the authorization token is allowed. Alternatively, the cloud service 30 can function in part as a gatekeeper and perform one or more security and/or authenticity checks prior to, during, and/or following a communication session.

As described above and shown in FIG. 3, a system for communicating with a client application may additionally include a presence server 114. The presence server is preferably integrated into the cloud service 30 through an API or any suitable interface. The presence information provided through the presence server is preferably used in processing and/or augmenting the communication of the cloud service 30. The presence server may alternatively be combined with any suitable component of the cloud service 30.

The system preferably implements the below methods in a computer-readable medium storing computer-readable instructions. The instructions are preferably executed by computer-executable components preferably integrated with the mobile devices 12, 14, 16, the cloud system 30, and the HTTP servers 18, 20, 22. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

3. Method for Detecting and Communicating Presence Information

Figure 6:
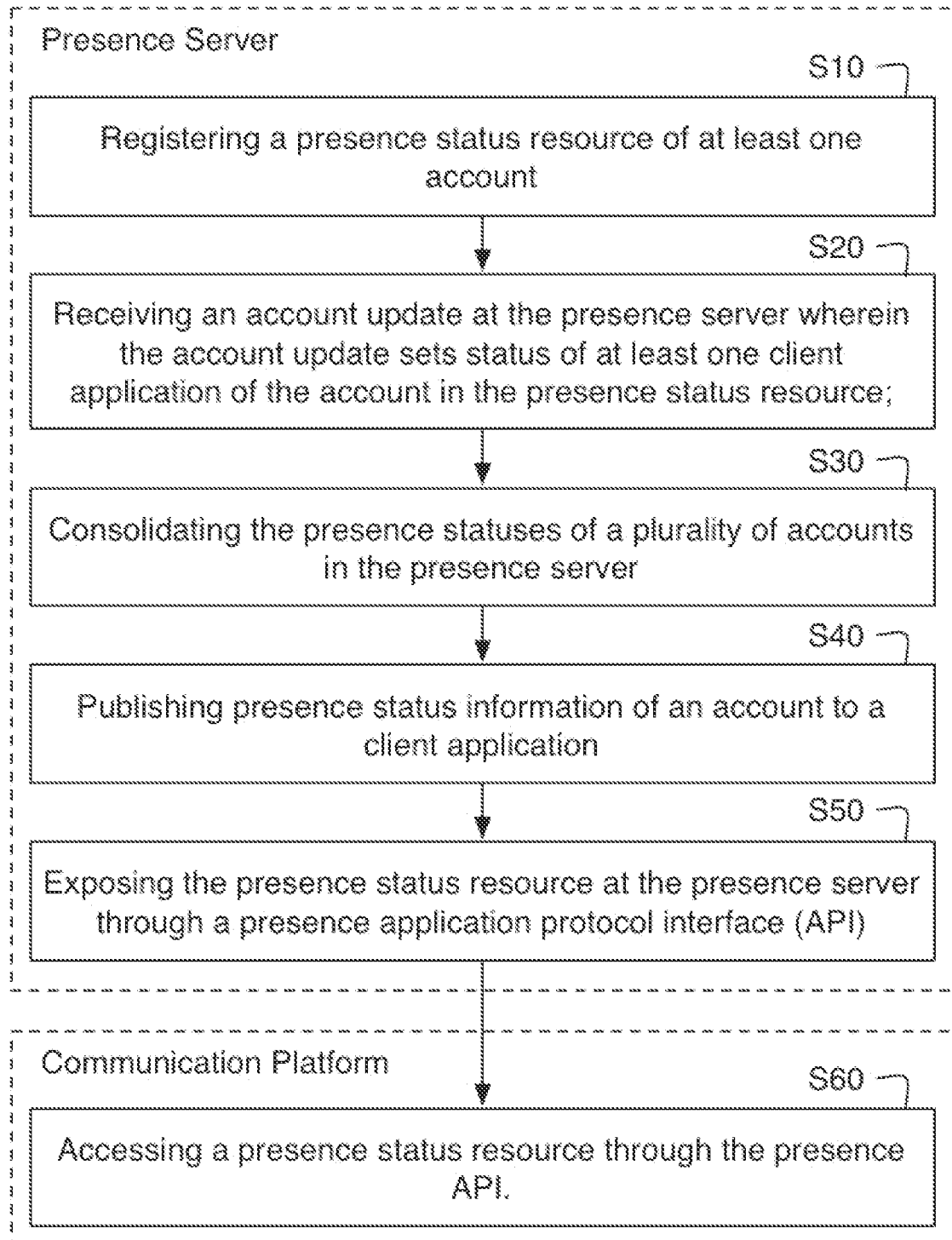
FIG. 6 is a flowchart depicting a method for determining and communicating presence information of a preferred embodiment of the present invention.
Figure 7:
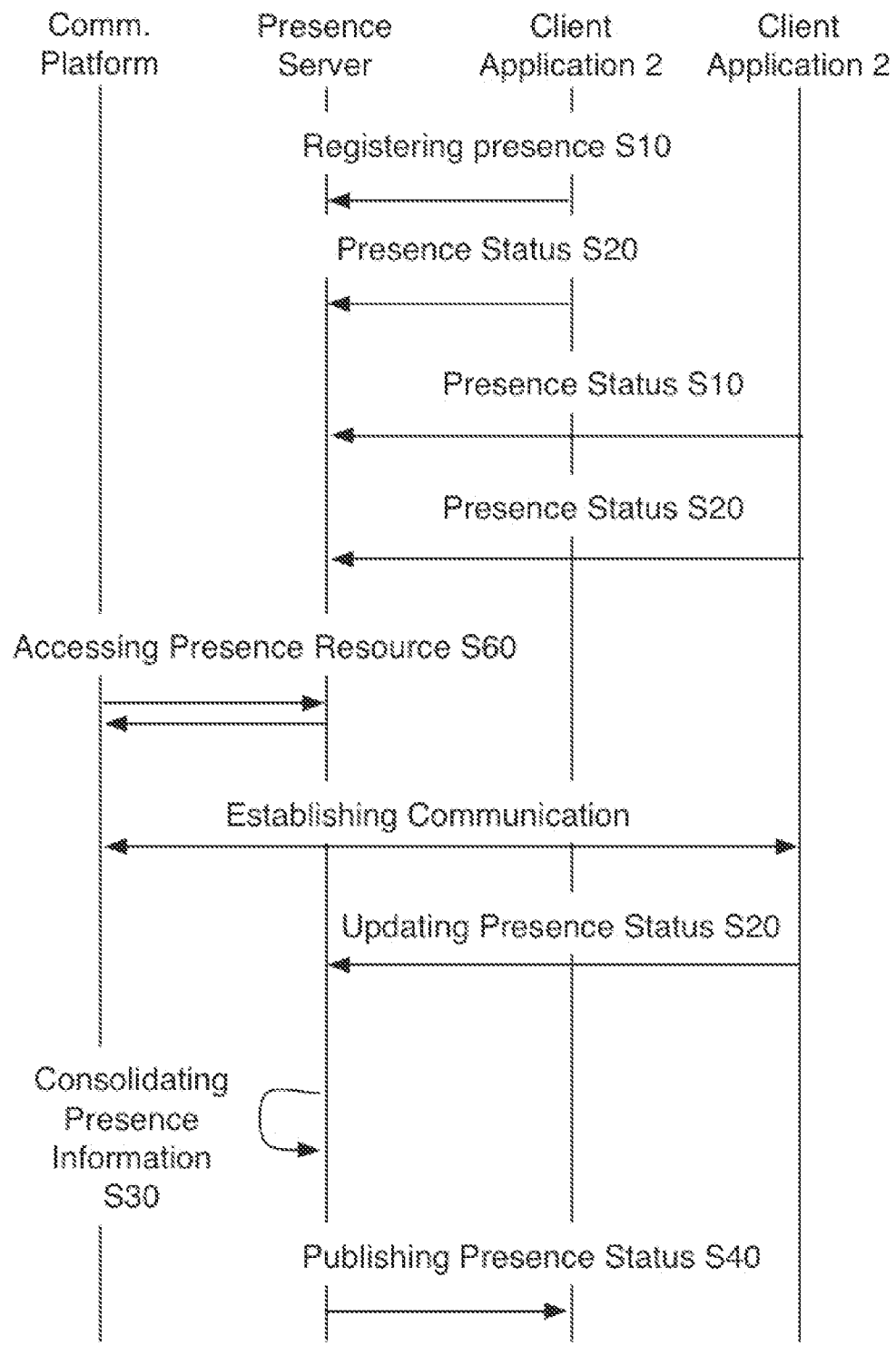
FIG. 7 is a schematic diagram of a method for detecting and communicating presence information of a preferred embodiment of the present invention.

As shown in FIGS. 6 and 7, a method for detecting and communicating presence information of a preferred embodiment may include at a presence server of a communication platform, registering a presence status resource of at least one account S10; receiving an account update at the presence server wherein the account update sets status of at least one client application of the account in the presence status resource S20; exposing the presence status resource at the presence server through a presence application protocol interface (API) S50; and at a communication platform, accessing a presence status resource through the presence API S60. The method functions to collect presence/availability information from a plurality of devices and a plurality of users, and enable access to the presence information in a scalable and efficient manner. The cloud based presence server in combination with a cloud communication platform system as described above preferably enables scalable presence-based features in communication applications. A communication platform that is a multitenant environment can preferably provide presence-enabled features to customers and/or developers utilizing the communication platform. The method may further be used to provide presence information to various client applications running on devices. The presence server preferably utilizes an authorization token as described above to enable client applications to register to provide and consume presence information.

Presence data transmitted to the presence server can include any number N of presence messages for each account and/or client application and/or device pairing, all of which may also be retransmitted at regular intervals. For example, incoming presence data from an outside system can include $N*nT$ data records, where N is the number of accounts and nT is the number of periods/intervals for which presence data is transmitted. The presence server preferably consolidates the presence information and presence updates to alleviate client applications and other systems from handling the significant amount of presence traffic. In some variations, the method may include publishing the presence information to a client application of an account.

Step S10, which includes at a presence server of a communication platform, registering a presence status resource of at least one account, functions to receive and establish presence data for an account. The presence data is preferably received in a first format for a plurality of accounts. A client application is preferably responsible for initiating and transmitting a communication to register the presence status of an account. Simultaneously or subsequently, Step S20 may update the status of the client application. In one variation this effectively sets the presence/availability of a device of a user. Additionally, presence status may be assumed for an account from which no contact has been made or a significant time delay has occurred since the last update. Registering a presence status preferably includes setting a publication subscription between the presence server and at least one client application of an account. This publication subscription functions to enable presence information to be delivered and/or received by a device as the presence information changes as described below. As with subsequent communications with the presence server, communication is preferably received in a first format, which can include for example an API format usable with the cloud system 30 described above or an XMPP format used in other applications.

Preferably, at a presence server or an alternative server of the communication platform, an authorization token is received. The authorization token is preferably received when the client application is attempting to connect. The authorization token is preferably verified to ensure the client application is permitted to perform the intended act of the client application (subscribing to calls, messages, contact list presence updates, and or any suitable action. As described above, authorizing preferably includes signing the authorization token against an account key (shared with the developer/account).

Step S20, which includes receiving an account update at the presence server wherein the account update sets presence status of at least one client application of the account in the presence status resource, functions to set the availability of an account. As mentioned above the presence status may be set during initial presence communication from a client application or account. The initial presence communication preferably indicates the identity of the account and if the account or client application is available or not available.

Subsequent updates can be received when a presence status change occurs in a client application of an account. Thus, whenever a device of an account has a status change the presence server preferably receives an account update that includes the change. Rather than consume copious amounts of network resources, a client application only updates a presence communication if and when there is a need to do so. Using the API and HTTP modus described herein, the method of the preferred embodiment preferably only alters a presence status resource in response to an affirmative change in such a state received by the client. Absent any change in the client's presence, then the method of the preferred embodiment will take no action and thereby consume fewer resources at the presence server and/or cloud service.

Presence status of an account may include the presence status of all associated client applications. Alternatively, the presence status of an account may be based on an assessment of the presence status of the client applications. In one variation, different presence statuses (e.g., available, busy, do not disturb, unavailable) may have different priority, and the presence status of an account may be set based on the highest priority of the individually set presence status of the client applications of an account. For example, if a user has two devices, one set to available and one set to do-not-disturb, the account presence status is preferably set to available since the user has one device set to available. Any suitable logic may be used to determine account presence status based on presence status of client applications of the account.

In another variation of Step S20, the presence status can include an additional natural language description of the status of the client application or account, apart from the binary rendition of whether or not the client is available. For example, a client Romeo can be available and also have an additional status, "wooing Juliet." Juliet, one of Romeo's contacts, can have the additional natural language status, "expecting roses," or the like. The presence status can also include attributes for presently unavailable contacts, such as busy, away (short term), and away (long term.) These attributes can be communicated in lieu of or in addition to the natural language status of the client. Accordingly, client Juliet can have a presence profile that indicates she is away (long term) in concert with a natural language status indicating that she is "asleep" and therefore not permanently away. Similarly, the client Romeo can have a presence profile that indicates that he is away in concert with a natural language status indicating that he is "on his way to Verona," in case any other contacts need to reach him directly. In another example configuration, Romeo and Juliet can have joint presence statuses, for example if they are on a conference call with one another both clients will have a busy attribute. Similarly, Romeo and Juliet can use the same natural language status for joint events, such as "star-crossed."

Additionally the method of a preferred embodiment may include consolidating the presence statuses of a plurality of accounts in the presence server S30. Step S30 functions to combine and simplify the disparate and innumerable presence status resources of the presence server. The presence server preferably includes presence information for a plurality of accounts, and an account may have presence information for a plurality of client applications/devices. In the application where a client application requires the presence information for a contact list of accounts, there is considerable presence information that is required. The presence server preferably consolidates the presence data of the various accounts into a single API style message to more effectively and efficiently communicate the necessary presence information to the consumer of presence status resource of the presence server (e.g., the client application). The presence server may alternatively consolidate presence information of client applications for an account or perform any suitable consolidation of presence data. The consolidated presence statuses are preferably published or otherwise transmitted to a client application, but may alternatively be accessed as a resource through the presence API. Consolidated presence statuses may be sent on regular intervals or more preferably published to subscribed client applications when an update occurs.

Additionally the method may include publishing presence status information of an account S40, which functions to disseminate information from the presence server to interested devices. Step S40 preferably publishes presence status of accounts in a contact list to a client application that has a subscription. The publication subscription may rely upon a pub/sub system, webhooks or any suitable mechanism for communicating messages to a client application. The published presence status information is preferably published as a consolidated message. Similar to how client applications can update presence status when there is a change, the presence server preferably publishes presence status information when there is a change in presence status information. In one variation, contact lists and updates to contact lists are published to client applications.

Step S50, which includes exposing the presence status resource at the presence server through a presence application protocol interface (API), functions to enable devices to interact and utilize the information of the presence server. All communication with the presence server is preferably performed through the presence API though alternative mechanisms may be used. For example, the consolidated presence information is preferably communicated through an API styled message. Client applications can additionally use a provided library or SDK to facilitate interfacing with the presence API. The presence status publication subscriptions may additionally be provided through the presence API. Preferably, the presence server is configured to operate with any API in a RESTful manner as defined and described above.

Step S60, which includes at a communication platform, accessing a presence status resource through the presence API, functions to integrate the presence information into the operation of a communication platform. The communication platform preferably accesses the presence status resources to augment behavior of the communication platform and/or provide insight into presence information for users of the communication platform. The communication platform preferably functions in a manner substantially similar to the methods described below in methods S1 and S2. In one variation of the method of the preferred embodiment, the presence server can be unique and disintegrated from any other suitable communication platform such as a cloud based telephony services. The communication platform in this variation may use a public presence API available to other components. In another variation of the method of the preferred embodiment, the presence server can be integrated into a larger communication such as a cloud based telephony service. The communication platform in this variation may use private and/or public presence API mechanisms to access and interact with the presence information of the presence server. Preferably, the communication platform will access presence status resources when processing logic of a communication application, and modify communication according to presence information access from the presence server. For example, the communication platform may route to a different device, change mediums of a communication, route a call or message to a different account, or perform any suitable action. The communication platform preferably communicates with a client application which preferably functions to provide presence information as well as serve as a communication endpoint for outgoing or incoming communication.

The method of the preferred embodiment can be configured partially or entirely in a computer-readable medium storing computer-readable instructions. The instructions are preferably executed by computer-executable components preferably integrated with a mobile devices, one or more portions of the cloud system and the presence server. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

4. Method for Connecting a Call to a Client

Figure 8:
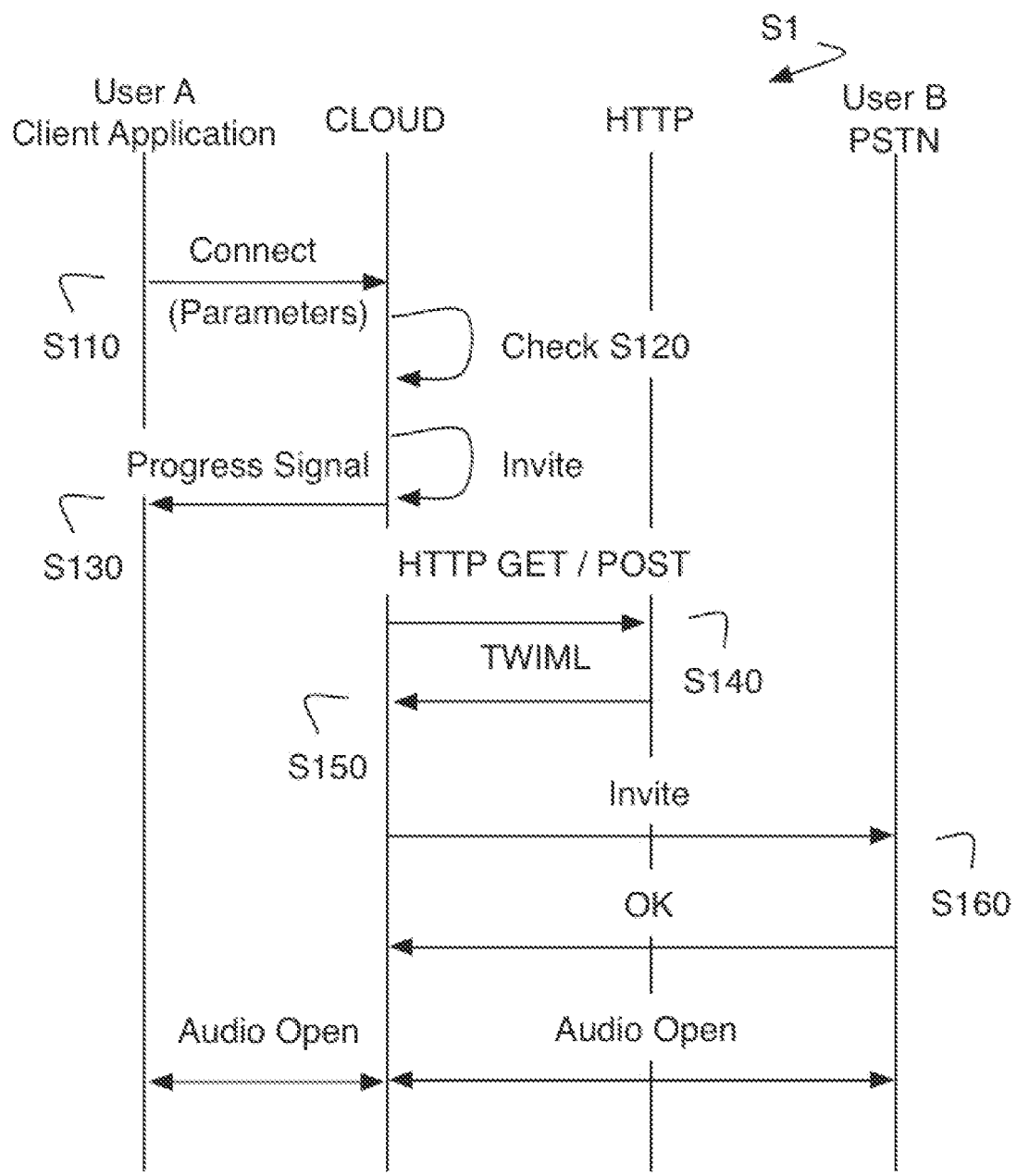
FIG. 8 is a schematic diagram of a method for making an outgoing media channel communication from a client application of a preferred embodiment of the present invention.
Figure 9:
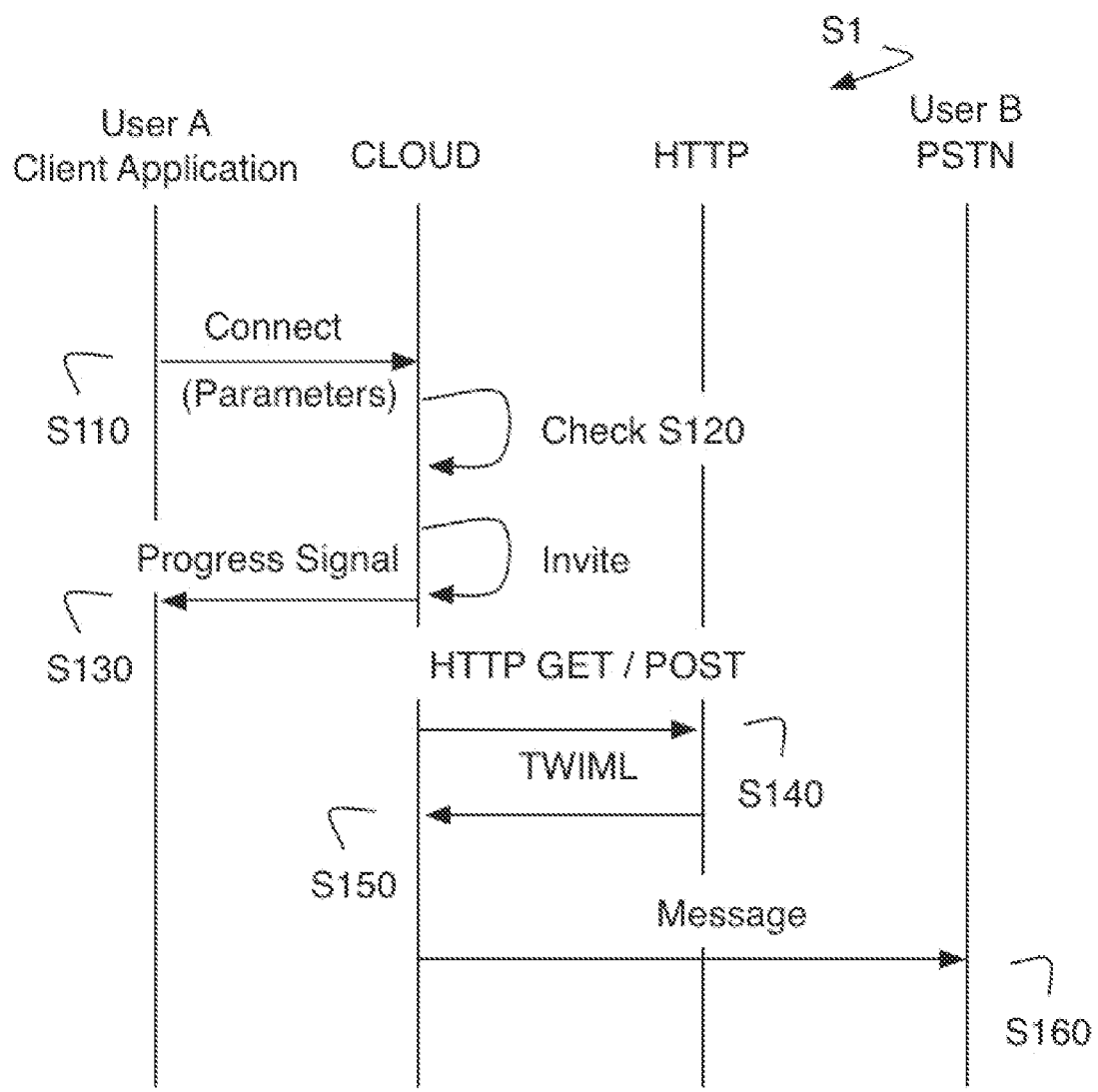
FIG. 9 is a schematic diagram of a method for sending an outgoing message from a client application of a preferred embodiment of the present invention.

As shown in FIGS. 8 and 9, a method S1 of a first preferred embodiment for making outgoing communications from a client application can include receiving a connection request from a first client application S110; verifying at least one parameter of the communication request S120; transmitting a progress signal to the first client application S130; retrieving communication instructions from a server according to the incoming communication request S140; identifying an instruction to make a call to a communication destination S150; and establishing communication with the communication destination S160. The method of the first preferred embodiment enables a client application to establish communication. The medium of communication is preferably a telephony based communication but may alternatively be any suitable communication medium such as video session, screen sharing, text messaging, and/or multimedia messaging. The method preferably establishes a media channel (i.e., communication session) such as an open voice channel between the first client application and at least a second endpoint. The method may alternatively perform one or more communication requests such as transmitting a message from the first client application to at least a second endpoint. As shown in FIG. 8, the method may be used for connecting a USER A that is using a client application to a USER B that is using a PSTN device. As shown in FIG. 9, the method may alternatively, be used for communicating a media message such as an SMS or MMS message from a USER A on a client application to a USER B using a PSTN device. The method as described herein, USER A can include a mobile device 14 of the type described above. USER B may be a PSTN connected device or a mobile device 14 of the type described above.

Step S110, which includes receiving a connection request from a first client application, functions to connect a USER A of client application to the CLOUD. The CLOUD is preferably a communication platform and can include one or more functions and/or hardware systems described above with reference to cloud service 30. Preferably, the CLOUD can include one or more separate servers and/or services configured for trafficking and connecting communications between the users in accordance with the principles of the API described above. The connection Step S110 functions to initiate communications over a predetermined protocol, such as SIP, RTMP and the like, between a mobile device and the CLOUD. The predetermined protocol is preferably an internet protocol utilizing an internet protocol such as TCP, UDP, and/or HTTP, but any suitable protocol may be used.

In one variation of the method of the preferred embodiment, the connecting step S110 can further include transmitting one or more permissions, parameters or tokens with the connection attempt. Preferably, the parameters can include one or more of a cloud system token (or security credential token) that can contain authentication credentials of USER A, a bridge token (which can have a null value in outgoing calls such as that shown in FIG. 8), and/or one or more user-defined parameters. The authentication token is preferably associated with security credentials that can authenticate and/or authorize a communication request to perform particular actions. The authorization token can preferably be used to verify if a bearer can perform a particular action and in some variations which operations to limit/permit. A communication request can be permitted to execute one or more communications. Any suitable restriction on the communications may additionally be associated with the authorization token such as number of communications, timing of communications, communication endpoints, and communication mediums. As described above, the authorization token is preferably created for a client application by a developer signing against their account key or some other suitable identifier. At the communication platform or at a service communicatively coupled to the communication platform, the authorization token can be verified against an account key provided to a developer or provider of a system using the client application. As an example, the user defined parameters can include additional constraints or conditions on the use of the system, such as for example particular users to whom calls can be placed, particular abilities of the token holder, identifiers of any applications or functions in use, or identifiers of any required recipients of communications, e.g., customer service or sales representatives. Preferably, any or all of the permissions can be consolidated into a single entity, such as the cloud system token; and any or all of the permissions can be sealed and kept invisible from USER A and partially or entirely transparent to any intermediary servers useable in the communication process.

Step S120, which includes verifying at least one parameter of the communication request, functions to check if the connection request should be completed. Preferably, the connection request is sent with a security credential token for a user of the first client application. The security credential token is preferably checked at the CLOUD to ensure the client application is allowed to make a connection request on behalf of the user. Permissions can be stored in association with an authorization token, and the authorization token preferably received in S110 is used to retrieve the associated permissions. The permissions are then used to determine if the communication request is allowed. Additionally or alternatively, the user defined parameters may be checked to ensure they satisfy any requirements or meet expectations. Additionally, step S120 can preferably function to check other diagnostic functions of the communication system and identify selected ports and/or communication channels for the impending communications. For example, the CLOUD may check to ensure that the connection request is not being made when the CLOUD is an overloaded state, and that the connection request satisfies an overload policy.

Step S130, which includes transmitting a progress signal to the first client application, functions to transmit a ringtone or confirmation message to USER A. The progress signal may take different forms depending on the communication medium. For voice or video calls, the progress signal is preferably a ringtone played for the user of the client application. In an asynchronous messaging application, the progress signal may indicate the delivery status of the message (e.g., sending, delivered, read). In some variations, the progress signal is a confirmation transmission to confirm the connection for the client application. The confirmation transmission is preferably transparent to a user and is only an acknowledgment by the CLOUD for the client application. The progress signal is preferably transmitted in response to an invite transmission within one or more of the CLOUD service. Preferably, the invite can include an application to which connection is sought, the account identification of the recipient, as well as the user defined parameters that were previously received in the CLOUD. Additionally, the invite can include a caller-identification or user identification of USER A. The invite is preferably a SIP invite but may be any suitable invite. In response to a smooth traffic flow of the invite within the one or more CLOUD servers, the CLOUD can preferably transmit the progress signal back to the mobile device via the SIP connection.

Step S140, which includes retrieving communication instructions from a server according to the incoming communication request, functions to fetch instruction markup determining communication logic. Step S140 preferably includes transmitting an HTTP request (such as a GET or POST) to the HTTP Server associated with the user account of the client application. Preferably the user account has a URL configured as a resource location of the communication instructions. Step S140 can preferably be performed simultaneously or substantially simultaneously with one or more variations of step S130, described above. In another variation of the method of the preferred embodiment, the HTTP request can include any or all of the permissions described above. Preferably, the HTTP request includes at least the user-defined parameters, which can be transmitted and received in an encrypted format. Alternatively, step S140 can include verifying one or more of the user defined parameters at or by the HTTP server.

Step S150, which includes identifying an instruction to make a call to a communication destination, functions to process the communication instructions and determine an outgoing communication destination. The communication instructions retrieved in Step S140 are preferably transmitted as a markup language format message to the CLOUD from the HTTP Server. In one variation of the method of the preferred embodiment, the markup language format message can include one of an HTML message, an XHTML message, an SGML message, or any other suitable markup language or variation or version thereof. In another variation of the method of the preferred embodiment, the markup language format message can include a TWiML message for use with a cloud system of the assignee of the present application. The communication instructions may include any suitable logic. In making an outgoing call, the communication instructions preferably include an instruction to dial or communicate with a communication destination.

Step S160, which includes establishing communication with the communication destination, functions to complete communication with the desired endpoint. Establishing communication can establish communication from the source of the communication request (e.g., USER A) and at least one party/endpoint. A plurality of destination endpoints/parties may alternatively be included in the established communication. In a first variation, the communication is preferably an open media channel (e.g., voice/audio, video, screen sharing or any suitable communication session) between the client application and a device of the communication destination. This variation preferably includes inviting the communication destination; and upon receiving acknowledgement of invite acceptance, opening an media channel between the communication destination and the first client application. The invite is preferably a SIP invite but may alternatively be any suitable invite to a media channel. This may be used to establish communication with a PSTN device and/or a second client application as described more below. In one example, a USER A is attempting to contact a PSTN USER B. Accordingly, the communication instructions can indicate that the recipient is a PSTN user, and therefore the CLOUD will preferably create an appropriate SIP invite and transmit it to an appropriate provider. As used herein, the PSTN network and/or service provider can include both mobile and landline-based telephony networks. A response is preferably received from the provider at the CLOUD service, wherein the response can include an appropriate HTTP status code such as 200 OK. Following confirmation and cross-confirmation between one or more components of the CLOUD service and the service provider, the method can open a media channel between USER A and USER B. As shown in FIG. 8, the media channel bypasses and/or is transparent to the HTTP server, but can be transmitted through one or more components of the CLOUD service. It should be understood that the media channel can also include other types of media, including at least video, screen sharing, SMS, MMS, or any other suitable communication media.

In a second variation of Step S160, establishing a communication with the communication destination can include performing one or more specific communication requests. Performing the communication request preferably includes sending an asynchronous message to the communication destination as shown in FIG. 9. An asynchronous message can be sent using protocols including SMS, MMS, IP-based messaging protocols, proprietary messaging protocols, and/or any suitable messaging protocol.

In another variation of the method of the preferred embodiment, USER A can be communicating on a mobile device having a native application, software program or set of machine executable instructions that functions to perform one or more of the steps outlined above. In one example configuration, the connect, check and invite steps S110, S120, S130 or significant portions thereof can all be performed by such a native application configured with an operating system of the mobile device. As an example, certain invite and authentication procedures, including for example the cloud system token and user defined parameters associated with the application native to the user's mobile device. In such an example configuration, the mobile device can communicate directly with the HTTP server via one or more requests and/or messages of the type described above.

Figure 10:
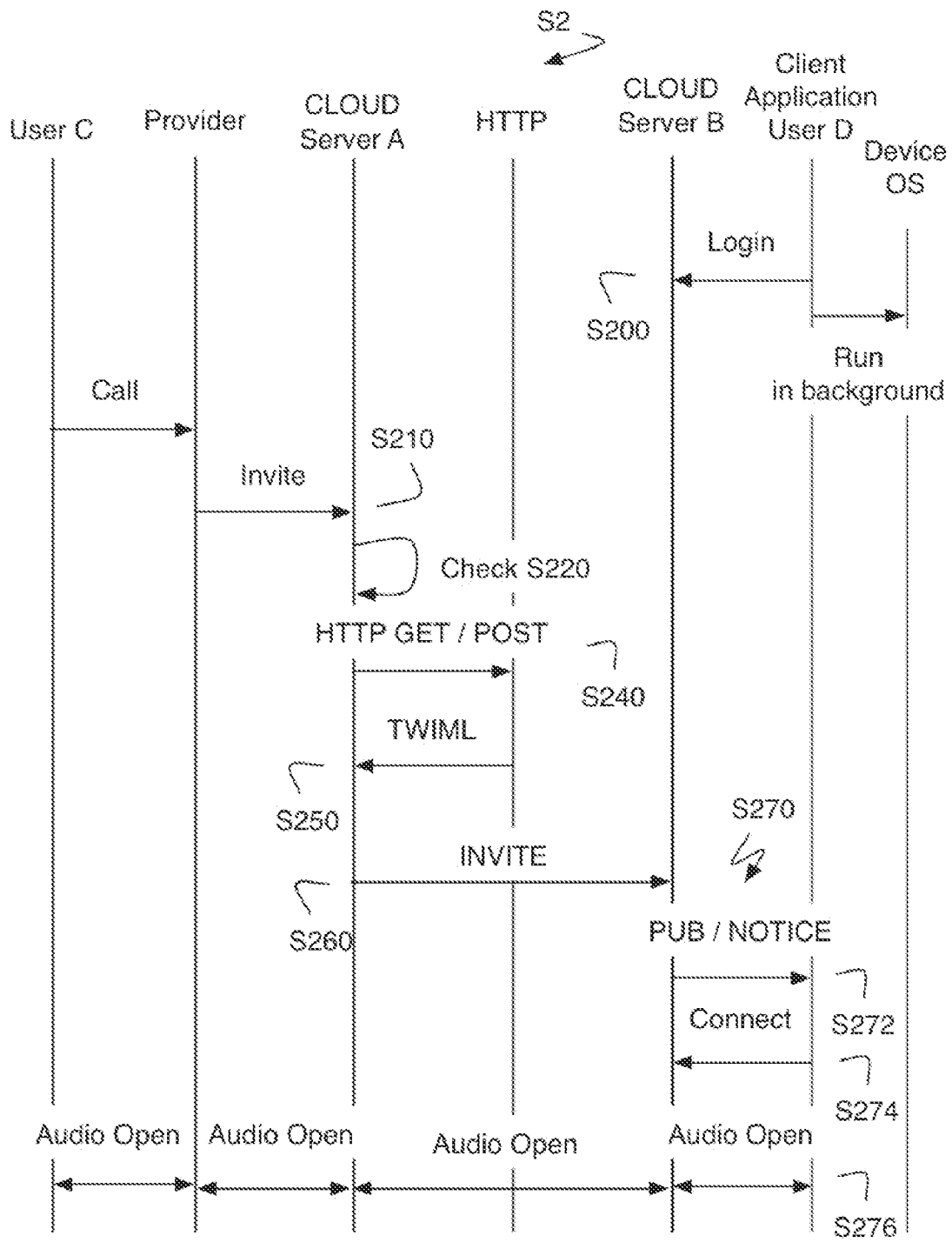
FIG. 10 is a schematic diagram of a method for establishing a media channel communication with a client application of a preferred embodiment of the present invention.
Figure 11:
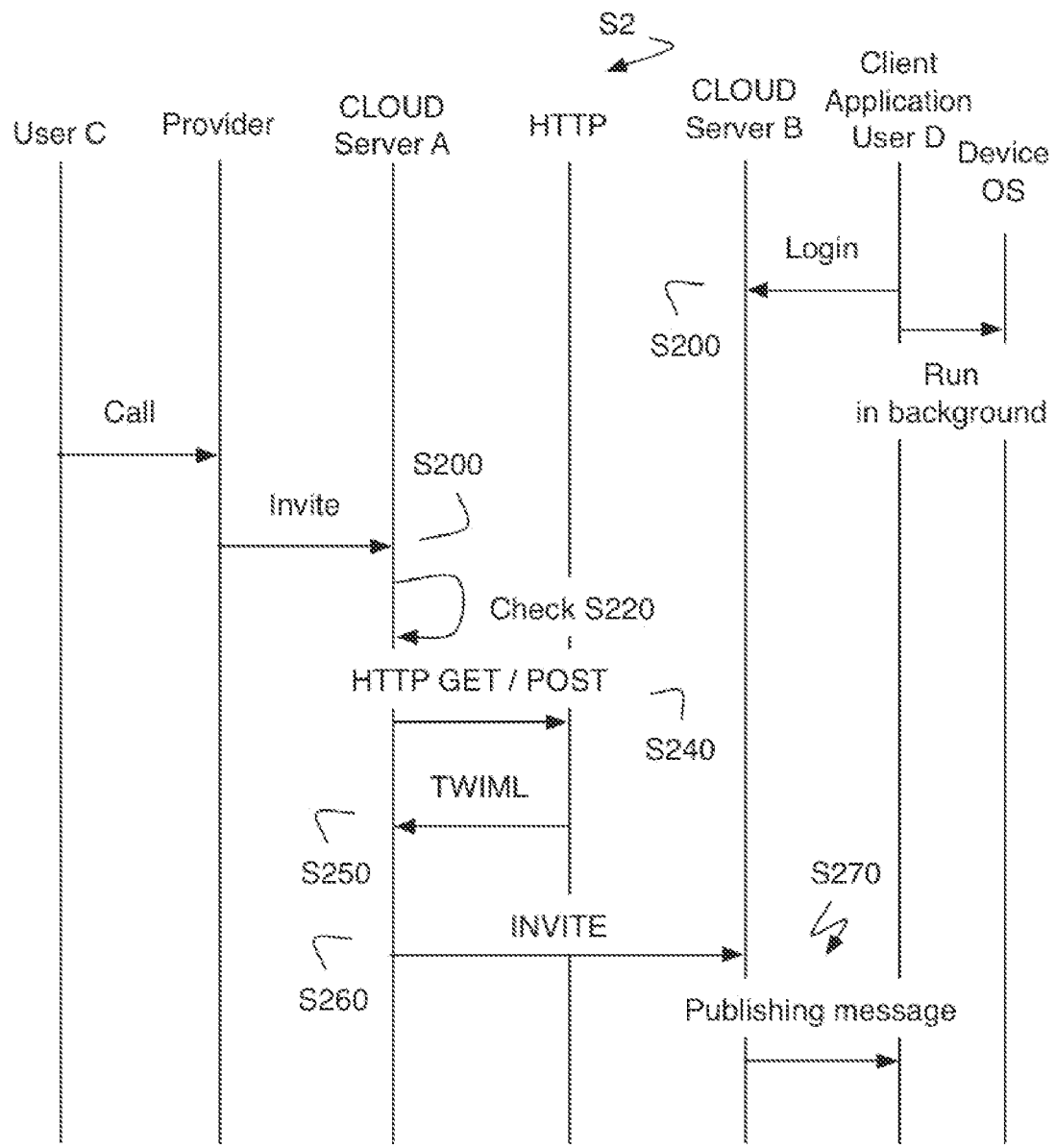
FIG. 11 is a schematic diagram of a method for sending a message communication to a client application of a preferred embodiment of the present invention.

As shown in FIGS. 10 and 11, a method S2 of a second preferred embodiment for receiving communication at a client application may include at a first server of a communication platform, receiving an executed login of a user of a first client application S200; at a second server of the communication platform, accepting an incoming communication request S210; retrieving communication instructions from a server according to the incoming communication request S240; identifying an instruction to make a call to a communication destination of the user of the first client application S250; forwarding the communication request to the first server of the communication platform S260; and at the first server of the communication platform, establishing communication with the first client application S270. The method functions to receive calls at a client application through the systems described above. The method is preferably employed to enable software applications or machine executable instructions running natively on a mobile device to interface with a telephony or communication platform. The method may be used such that a PSTN device or any suitable communication capable device may contact the client application. The method may be used for voice, video, SMS, MMS, IP based messaging, proprietary messaging, and/or any suitable communication medium. The method may be used in combination with the method above for making outgoing communications from a client application such that a first client application may contact a client application. The pairs of steps S110 and S210, S120 and S220, S140 and S240, and S150 and S250 may in some variations be substantially similar to their corresponding step.

Step S200, which includes at a first server of a communication platform, receiving an executed login of a user of a first client application, functions to establish a connection of a user to a communication platform/CLOUD system. The user preferably uses a mobile device having a native application (with a client application) of the type described above, but any suitable device with a client application may be used. Preferably, when USER D logs into his account on CLOUD B, a URL subscription <userd_sid>/USERD is established in CLOUD B such that USER D will receive any messages published to that URL. Example messages can include voice, video, SMS, MMS, email or any other suitable type of electronic communication audible or readable on a mobile device.

Step S210, which includes at a second server of the communication platform, accepting an incoming communication request, functions to initiate a call from a caller (e.g., USER C) to the user of the first client application (e.g., USER D). As shown in FIG. 5, the call initiation can be processed at a service provider, such as for example a PSTN service provider for a mobile telephony or landline telephony network. The service provider can function to receive a telephonic communication (voice, SMS, MMS) and convert that incoming communication into an SIP request transmittable to CLOUD A. Alternatively, the caller may be initiated by device using a second client application, and the outgoing call may be established in manner substantially similar to that of the method for making outgoing communications from a client application. In step S220 of the method of the preferred embodiment, CLOUD A will perform a check of the received SIP invite, which can include checking a recipient account, a voice URL for the account, an SMS or MMS URL for the account and/or any other account-specific or user specific permissions or preferences associated with the account of USER D. In the variation where a call is initiated from a second client application, the method S2 may include transmitting a progress signal to the second client application, which is substantially similar to Step S130.

Steps S240 and S250, which include retrieving communication instructions from a server according to the incoming communication request and identifying an instruction to make a call to a communication destination of the user of the first client application, function to process the application logic of a communication platform application. Step S240 of the method of the preferred embodiment preferably includes transmitting an HTTP request from CLOUD A to the users HTTP Server in response to a successful check of the recipient's credentials. As an example, once CLOUD A identifies a voice URL associated with USER D's account, CLOUD A can transmit an HTTP GET/POST request to USER D's HTTP Server. Step S250 of the method of the preferred embodiment preferably processes the communication instructions and determine an outgoing communication destination corresponding to the user of the first client application. A markup language format message is preferably received at CLOUD A from the HTTP Server. In one variation of the method of the preferred embodiment, the markup language format message can include one of an HTML message, an XHTML message, an SGML message, or any other suitable markup language or variation or version thereof. In another variation of the method of the preferred embodiment, the markup language format message can include a TWiML message for use with a cloud system of the assignee of the present application.

Step S260, which includes forwarding the communication request to the first server of the communication platform functions to communicate the incoming communication request to a portion of the CLOUD that manages the logged in user. For media channels communication requests such as voice or video calls, an invite request is transmitted from CLOUD A to CLOUD B in response to the receipt of the markup language format message from USER D's HTTP Server. Preferably, the invite request contains at least an account identification for USER D and a client name (USER D) associated with the account during the login step S200. The invite request is preferably a SIP invite as is known in the art. In the case of an asynchronous messaging, the text, and/or media message may be contained in the communication message sent to the server of CLOUD B as shown in FIG. 11. The first server of the communication platform may additionally or alternatively include or function as a subscription manager of the communication platform. The communication request may subsequently be forwarded to an appropriate server to manage the subscription or login session of the user of the first client application.

Step S270, which includes at the first server of the communication platform, establishing communication with the first client application; functions to complete the communication request initiated in Step S200. Step S270 preferably completes the communication request between the entity of the incoming communication request (e.g., USER C) and the user of the first client application (e.g., USER D). Establishing communication with the first client application preferably includes publishing a notification to the first client application S272. In one variation of the method of the preferred embodiment, CLOUD B can publish an invite message to USER D's URL while simultaneously causing the caller, USER C, to hear a ringtone. In Step S272 CLOUD B can receive the publication of the invite message and broadcast it to all registered listeners, i.e., those users associated with the account established in step S200. Establishing communication with the first client application may include varying steps depending on if the method is employed for establishing a media channel between two parties or for sending a message from one entity to a user of the first client application.

Establishing communication for a media channel communication request can additionally include receiving a connection acceptance by the first client application S274; and opening a media channel with the first client application upon connection S276. If USER D agrees to accept the incoming call, then he will transmit a connection acceptance to CLOUD B as shown in step S274. The acceptance can include the transmission of one or more permissions with the connection acceptance. Preferably, the permissions can include one or more of a cloud system token containing the security credentials of USER D (which can have a null value since the call is being received in FIG. 10), a bridge token (which might have been copied from the invitation from CLOUD B), and one or more user defined parameters. In another variation of the method of the preferred embodiment, CLOUD B step S274 can also include checking the one or more permissions at CLOUD B, which can include for example checking if there are a predetermined number of parameters (even though one or more can be null). Alternatively, step S274 can further include unpacking the bridge token to identify an IP address associated with one or more CLOUD A or CLOUD B servers to ensure that communications are properly routed and merged through the appropriate portion of CLOUD A or CLOUD B, i.e., a bridge portion of one of the respective CLOUD services. In another variation of the method or the preferred embodiment, step S274 can include bridging the call between USER C and USER D in response to a bridge token associated with the connection request from USER D.

In another variation of the method of the preferred embodiment, step S274 can recite responding from the provider to the CLOUD service, wherein the response can include an appropriate HTTP status code such as 200 OK. Following confirmation and cross-confirmation between one or more components of the CLOUD service and the service provider, step S216 of the method of the preferred embodiment recites opening an audio channel between USER C and USER D. As shown in FIG. 10, the audio channel bypasses and/or is transparent to the HTTP server, but can be transmitted through one or more components of the CLOUD A and CLOUD B components.

In another variation of the method of the preferred embodiment, USER D can be communicating on a mobile device having a native application, software program or set of machine executable instructions that functions to perform one or more of the steps outlined above. In one example configuration, the login, pub/notice and connect steps S200, S272, S274 or significant portions thereof can all be performed by such a native application configured with an operating system of the mobile device. As an example, certain invite and authentication procedures, including for example the cloud system token and user defined parameters associated with the application native to the user's mobile device. In such an example configuration, the mobile device can communicate directly with the HTTP server via one or more requests and/or messages of the type described above.

Figure 12:
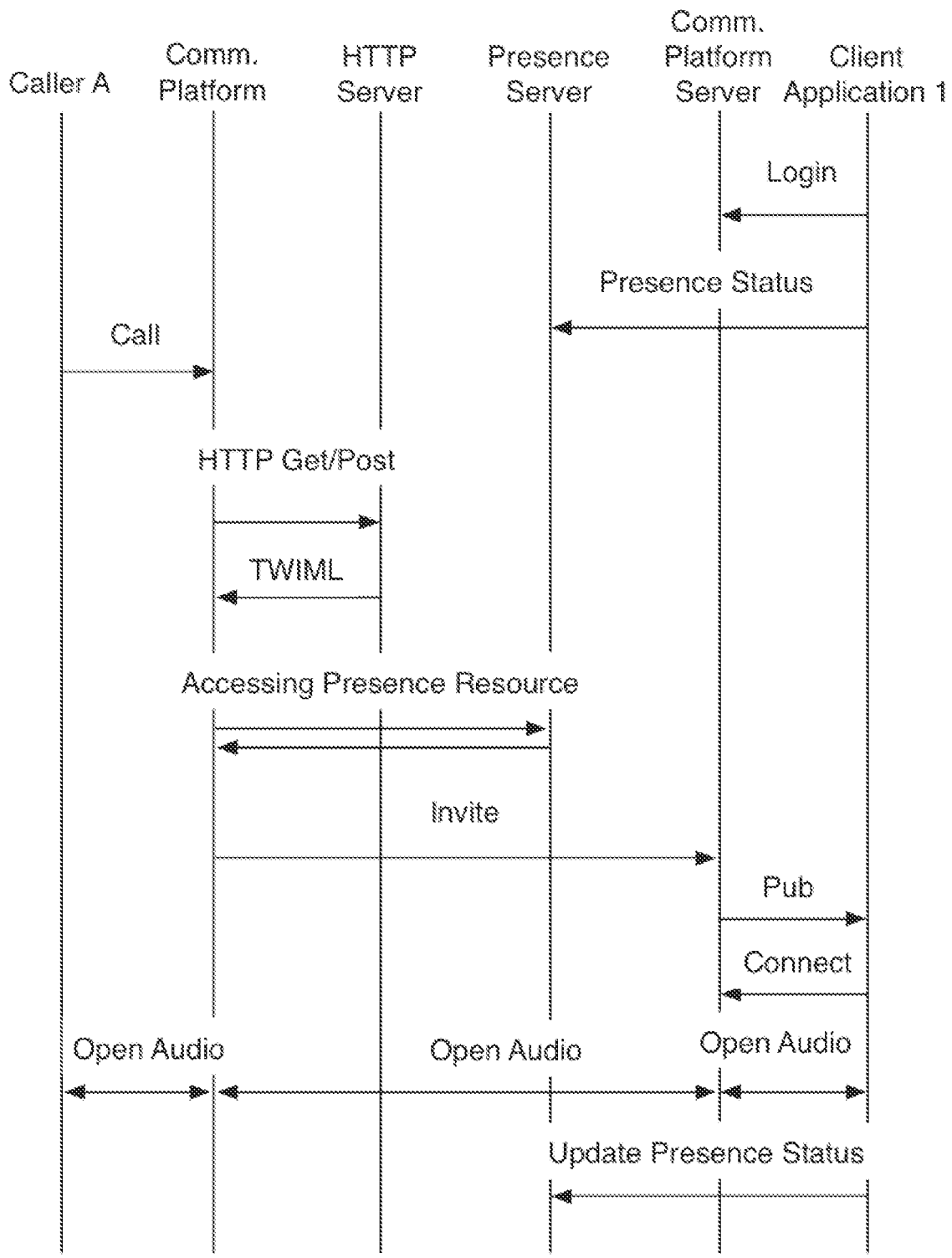
FIGS. 12 and 13 are schematic diagrams of variations of a method for detecting and communicating presence information of a preferred embodiment of the present invention.

Additionally, the method S2 and/or method S1 may be used in combination with the method for communicating presence information as shown in FIG. 12. The method preferably includes steps for communicating presence information and additionally steps for receiving communication at a client application. The method preferably comprises at a presence server: registering a presence status resource of at least one account, receiving an account update at the presence server wherein the account update sets status of at least one client application of the account in the presence status resource, and exposing the presence status through a presence application protocol interface (API); and at a communication platform: receiving a connection request from a calling entity, retrieving communication instructions from a server according to the incoming communication request, identifying an instruction communicate with a communication destination, accessing a presence status resource through the presence API, and establishing communication with the communication destination according to the accessed presence status resource. The method may include any suitable combination or variations of the above methods and systems or any suitable alternatives. The authorization token and verifying of the authorization token may be used to both set up the presence status resource of a client application and the communication endpoint of a client device. Thus a client application that executes a login by sending an authorization token can simultaneously set up their presence information and enable the client application to make outgoing communications or receive incoming communications. A publication subscription between the communication platform and the client application may be used for both presence and communication purposes.

As shown in FIG. 12, the method may be employed to modify communication to a client application or any suitable device with a presence status. The method may be used for media connections such as opening voice or video channels. It may alternatively or additionally be used for messaging such as SMS, MMS, IP-based messaging, proprietary messaging, and/or any suitable messaging protocol. The presence information may be used by the communication platform to alter communication in any suitable manner. The presence of an account is preferably accessed and processed during, in preparation, or as a result of processing communication instructions. The communication instructions may be customized and developed by third parties and have any suitable variations in the application of presence information in communication apps.

In one variation, the method is used to route to the available client application of an account. For example, user A may call user B, but user B can have three devices associated with the account. The communication platform will preferably use the presence information to determine which of the three devices to connect to user A. This may be used to route to one of a plurality of devices of a user.

In another variation the method may be used to route to one of a plurality of available accounts. In a call center, customer support agents may all have an account and an active client application. Throughout the day various agents will be busy. The communication platform may intelligently distribute calls to an account based on availability and even how much load (i.e., number of calls an agent has supported).

Figure 13:
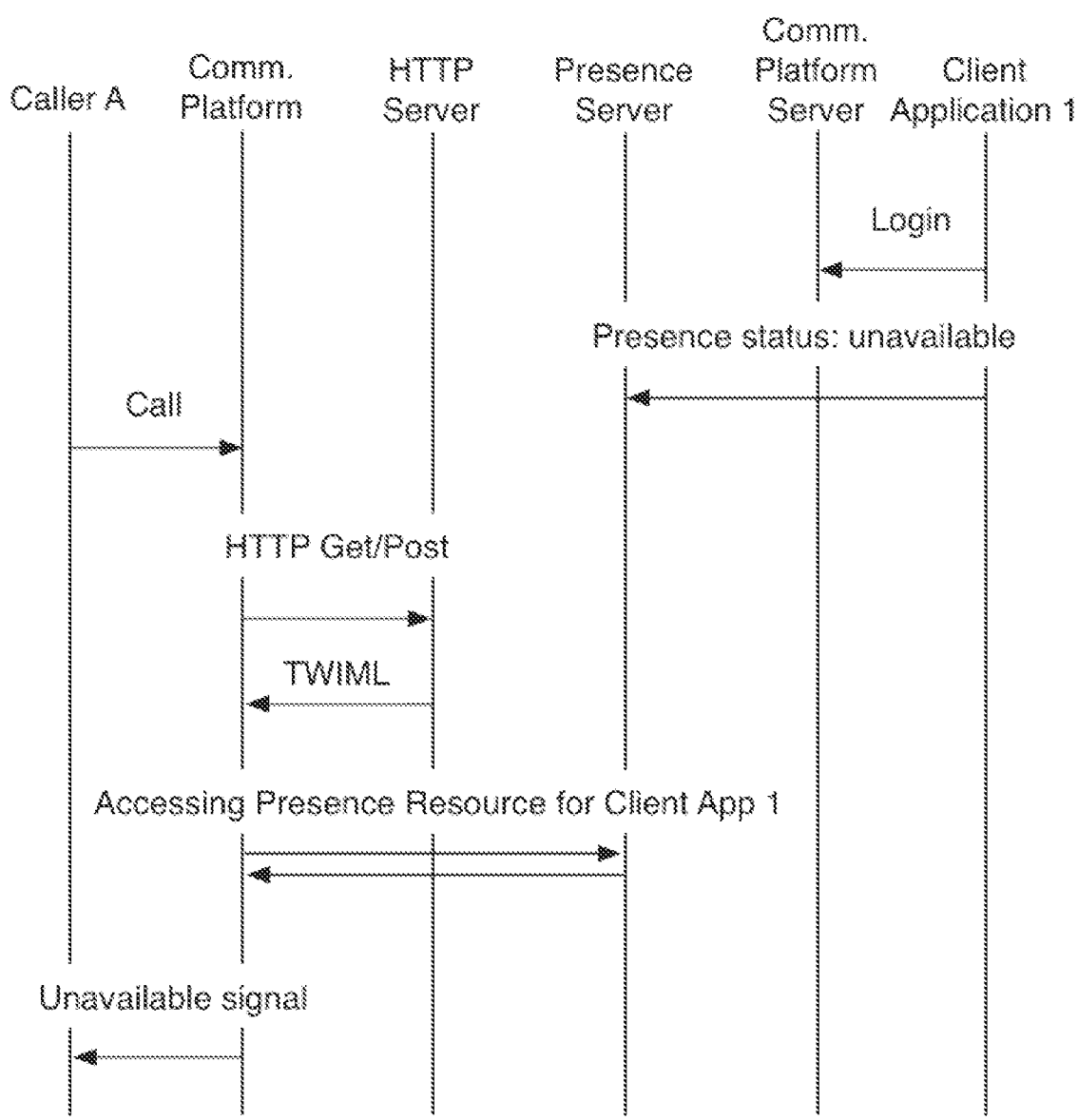

In yet another variation, the method may be used to indicate to a caller that the account is not available as shown in FIG. 13. For example, user A may call user B. When the communication platform determines that user A is trying to connect to user B, the communication platform preferably accesses the presence status resource for user B. If user B is not available as indicated in the presence status resource, then the communication platform preferably transmits an unavailable signal to the user A. The unavailable signal may be a busy signal, a text-to-speech transcription of a message set by user B, or any suitable indicator of the presence information of user B.

As shown in FIGS. 10 and 11, the cloud services can be broken in to two or more segments, including for example CLOUD A and CLOUD B. Those of skill the art will appreciate that these designations are for illustrative and descriptive ease only, and that CLOUD A and CLOUD B can include a single computer/server having multiple functions or multiple discrete computers/servers having unique functions, depending upon the particular configuration sought by the user. The method of the preferred embodiment can be configured partially or entirely in a computer-readable medium storing computer-readable instructions. The instructions are preferably executed by computer-executable components preferably integrated with a mobile devices, one or more portions of the cloud system and the HTTP servers. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method, comprising:
receiving, by a processing device, a communication request initiated by a first client device of a first account of a communication platform, the communication request specifying a second account of the communication platform;
receiving, via an application programming interface (API), a plurality of messages associated with a plurality of communication applications associated with the second account, each message of the plurality of messages indicating a presence status of a user identified by the second account in a communication application of the plurality of communication applications;
determining, by consolidating the plurality of messages, presence data associated with the second account;
selecting, among a plurality of devices associated with the second account, a second client device having an available presence status based on the presence data associated with the second account; and
establishing a communication between the first client device and the second client device.

2. The method of claim 1, wherein each of the first client device and the second client device runs a communication application supported by the communication platform, and wherein each of the first account and the second account is associated with the communication application.

3. The method of claim 1, wherein the presence data comprises a respective presence status for one or more communication applications running on each of the plurality of devices.

4. The method of claim 1, further comprising:
determining a presence status of the second account by selecting a highest priority presence status among a plurality of application present statuses of a plurality of communication applications associated with the second account.

5. The method of claim 1, further comprising:
identifying, among a plurality of application present statuses of a plurality of communication applications associated with the second account, a subset of communication applications connectable to or more communication applications running on the first client device; and
determining a presence status of the second account by selecting a highest priority presence status among a subset of application present statuses of the subset of communication applications.

6. The method of claim 1, further comprising:
receiving an API request for accessing the presence data associated with the second account; and
returning an API message that includes the presence data in response to the API request.

7. The method of claim 1, further comprising:
responsive to receiving a login authorization token from a communication application running on the second client device, updating the presence data associated with the second account.

8. A system, comprising:
a memory; and
a processing device, coupled to the memory, the processing device configured to:
receive a communication request initiated by a first client device of a first account of a communication platform, the communication request specifying a second account of the communication platform;
receive, via an application programming interface (API), a plurality of messages associated with a plurality of communication applications associated with the second account, each message of the plurality of messages indicating a presence status of a user identified by the second account in a communication application of the plurality of communication applications;
determine, by consolidating the plurality of messages, presence data associated with the second account;
select, among a plurality of devices associated with the second account, a second client device having an available presence status based on the presence data associated with the second account; and
establish a communication between the first client device and the second client device.

9. The system of claim 8, wherein each of the first client device and the second client device runs a communication application supported by the communication platform, and wherein each of the first account and the second account is associated with the communication application.

10. The system of claim 8, wherein the presence data comprises a respective presence status for one or more communication applications running on each of the plurality of devices.

11. The system of claim 8, wherein the processing device is further configured to: determining a presence status of the second account by selecting a highest priority presence status among a plurality of application present statuses of a plurality of communication applications associated with the second account.

12. The system of claim 8, wherein the processing device is further configured to: identify, among a plurality of application present statuses of a plurality of communication applications associated with the second account, a subset of communication applications connectable to or more communication applications running on the first client device; and determine a presence status of the second account by selecting a highest priority presence status among a subset of application present statuses of the subset of communication applications.

13. The system of claim 8, wherein the processing device is further configured to: responsive to receiving a login authorization token from a communication application running on the second client device, update the presence data associated with the second account.

14. A non-transitory computer-readable storage medium comprising executable instructions that, responsive to execution by a processing device, cause the processing device to:

receive a communication request initiated by a first client device of a first account of a communication platform, the communication request specifying a second account of the communication platform;

receive, via an application programming interface (API), a plurality of messages associated with a plurality of communication applications associated with the second account, each message of the plurality of messages indicating a presence status of a user identified by the second account in a communication application of the plurality of communication applications;

determine, by consolidating the plurality of messages, presence data associated with the second account;

select, among a plurality of devices associated with the second account, a second client device having an available presence status based on the presence data associated with the second account; and establish a communication between the first client device and the second client device.

15. The non-transitory computer-readable storage medium of claim 14, wherein each of the first client device and the second client device runs a communication application supported by the communication platform, and wherein each of the first account and the second account is associated with the communication application.

16. The non-transitory computer-readable storage medium of claim 14, wherein the presence data comprises a respective presence status for one or more communication applications running on each of the plurality of devices.

17. The non-transitory computer-readable storage medium of claim 14, further comprising executable instructions that, responsive to execution by the processing device, cause the processing device to:

determine a presence status of the second account by selecting a highest priority presence status among a plurality of application present statuses of a plurality of communication applications associated with the second account.

18. The non-transitory computer-readable storage medium of claim 14, further comprising executable instructions that, responsive to execution by the processing device, cause the processing device to:

identify, among a plurality of application present statuses of a plurality of communication applications associated with the second account, a subset of communication applications connectable to or more communication applications running on the first client device; and determine a presence status of the second account by selecting a highest priority presence status among a subset of application present statuses of the subset of communication applications.

\* \* \* \* \*